US006205016B1

(12) United States Patent
Niu

(10) Patent No.: US 6,205,016 B1
(45) Date of Patent: Mar. 20, 2001

(54) FIBRIL COMPOSITE ELECTRODE FOR ELECTROCHEMICAL CAPACITORS

(75) Inventor: Chun-Ming Niu, Lexington, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 08/869,124

(22) Filed: Jun. 4, 1997

(51) Int. Cl.[7] .................................................. H01G 9/00
(52) U.S. Cl. .......................................... 361/503; 361/502
(58) Field of Search .................................. 361/502, 503, 361/508, 509, 512, 516, 524, 528, 529, 532; 29/623.4; 423/447.3, 447.1, 447.2; 502/174, 439, 527, 159, 182, 185

(56) References Cited

U.S. PATENT DOCUMENTS

| | | | | |
|---|---|---|---|---|
| 4,663,230 | * | 5/1987 | Tennent | 428/367 |
| 5,260,855 | * | 11/1993 | Kaschmitter et al. | 361/502 |
| 5,336,274 | * | 8/1994 | Mayer et al. | 29/623.4 |
| 5,402,306 | * | 3/1995 | Mayer et al. | 361/502 |
| 5,529,971 | * | 6/1996 | Kaschmitter et al. | 502/416 |
| 5,581,438 | * | 12/1996 | Halliop | 361/502 |
| 5,626,977 | * | 5/1997 | Mayer et al. | 429/44 |
| 5,855,953 | * | 1/1999 | Cao et al. | 427/226 |

* cited by examiner

Primary Examiner—Dean A. Reichard
Assistant Examiner—Anthony Dinkins
(74) Attorney, Agent, or Firm—Whitman Breed Abbott & Morgan LLP

(57) ABSTRACT

Composite electrodes including carbon nanofibers (fibrils) and an electrochemically active material are provided for use in electrochemical capacitors. The fibril composite electrodes exhibit high conductivity, improved efficiency of active materials, high stability, easy processing, and increase the performance of the capacitor. A method for producing the composite electrodes for use in electrochemical capacitors is also provided.

32 Claims, 2 Drawing Sheets

FIBRIL COMPOSITE ELECTRODE FOR ELECTROCHEMICAL CAPACITORS

BACKGROUND OF THE INVENTION

1. Field of the Invention

This application generally relates to electrochemical capacitors, more particularly to fibril composite electrodes for electrochemical capacitors.

2. Description of the Related Art

Several publications are referenced in this application. These references describe the state of the art to which this invention pertains, and are incorporated herein by reference.

Electrochemical capacitors (ECs) are gaining acceptance in the electronics industry as system designers become familiar with their attributes and benefits. Compared with conventional capacitors, ECs have extremely high capacitance values, limited frequency response, high equivalent series resistance (ESR) which is directly related to electrode thickness and inversely proportional to the cross sectional area of the electrode, voltage-dependent capacitance, and voltage-dependent self-discharge rate. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. And in electric vehicle applications, large ECs can "load-level" the power on the battery system and thereby increase battery life and extend vehicle range.

Capacitors store energy in the electric field between two oppositely charged parallel plates, which are separated by an insulator. The amount of energy a capacitor can store increases as the area of conducting plates increases, the distance between the plates decreases, and the dielectric constant (the ability to store charge between the plates) of the insulating material increases.

Electrochemical capacitors can generally be divided into two subcategories: double layer capacitors in which the capacitance at the electrode/electrolyte interface can be modeled as two parallel sheets of charge; and pseudocapacitor devices in which charge transfer between the electrode and the electrolyte occurs over a wide potential range. These charge transfers are believed to be the result of primary, secondary, and tertiary oxidation/reduction reactions between the electrode and the electrolyte.

There are generally two kind of pseudocapacitor materials: metal oxides, (i.e., $RuO_2$, $IrO_2$, and $CoO_2$) and redox conductive polymers (i.e., polyaniline, polypyrrole, and polythiophene). Pseudocapacitors suffer from high material cost and low cell voltage. Metal oxide capacitors are very expensive as many of the preferred metals, such as Ru and Ir, are very costly. Redox polymers have relatively high energy storage capacity, low cost and long cycle life. However, these conductive polymers have a narrow working voltage in proton conducting electrolytes.

The high volumetric capacitance density of an EC (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation". In some ECs, stored energy is substantially augmented by so-called "pseudocapacitance" effects, occurring again at the solid-electrolyte interface. Double layer capacitors are commonly of the order of 16–40 $\mu F\ cm^{-2}$ while pseudocapacitors associated with EC systems are commonly 10–100 $\mu F\ cm^{-2}$.

The double layer capacitor is based on a high surface area electrode material, such as activated carbon, immersed in an electrolyte. A polarized double layer is formed at each electrode providing double-layer capacitance. The carbon provides a high surface area, A, and the effective d is reduced to an atomic scale, thus providing a high capacitance.

Although the energy storage capability of the double layer was recognized more than 100 years ago, it took the development of low-current-draw volatile computer memories to create a market for ECs.

ECs are distinguishable from traditional electrolytic capacitors which store energy by charge separation across a thin insulating oxide film that is often formed by a controlled electrolytic oxidation process at an appropriate metal.

Conventional electrochemical energy storage is achieved in a galvanic cell or a battery of such cells. The energy corresponds to the charge associated with chemical redox changes that can occur in the battery on discharge, multiplied by the voltage difference between the electrodes of the cell. The discharge process involves a net chemical reaction in the cell associated with passage of a certain number of electrons or faradays per mole of reactants.

If an electrochemical reaction, such as a redox process, should occur at or near the electrode, the capacitance may be further increased. This increased capacitance is sometimes termed "pseudocapacitance" and the resulting device, while properly an electrochemical capacitor, is informally called a pseudocapacitor. An electrochemical capacitor will have a different cyclic voltammogram than a pure double-layer capacitor, the pseudocapacitance revealing a Faradaic signature.

Redox systems, especially of $RuO_2.xH_2O$, for electrochemical capacitors have been demonstrated (Zheng, Z. P. and Jow, T. R., "A new charge storage mechanism for Electrochemical Capacitors", J. Electrochem. Soc., 142, L6 (1995)), but high cost and limited cycle life are continuing impediments to commercial use of such materials. The greater the Faradaic component of the capacitance, the more the discharge curves and life approach those of a battery rather than those of a capacitor. On the other hand, the specific goals of obtaining high power output suitable for electric vehicle (EV) applications cannot be met by a pure double layer capacitor using known or proposed electrode materials (Eisenmann, E. T., "Design Rules and Reality Check for Carbon-Based Ultracapacitors", SAND95-0671•UC-400 April 1995).

ECs do not approach the energy density of batteries. For a given applied voltage, capacitatively storage energy associated with a given charge is half that storable in a corresponding battery system for passage of the same charge. This difference is due to the fact that in an ideal battery reaction, involving two-phase systems, charge can be accumulated at constant potential while, for a capacitor, charge must be passed into the capacitor where voltage and charge is being continuously built up. This is why energy storage by a capacitor is half that for the same charge and voltage in battery energy storage under otherwise identical and ideal conditions.

Nevertheless, ECs are extremely attractive power sources. Compared with batteries, they require no maintenance, offer much higher cycle-life, require a very simple charging circuit, experience no "memory effect", and are generally much safer. Physical rather than chemical energy storage is the key reason for their safe operation and extraordinarily high cycle-life. Perhaps most importantly, capacitors offer higher power density than batteries.

However, presently available EC products are limited in size and power performance, due primarily to their memory backup use. They have capacitance values of up to a few Farads, an equivalent series resistance (ESR) of one to fifty ohms, and a working voltage of 3 to 11 V.

Until recently, ECs suitable for high-power applications have been unavailable. But interest in automotive starting, lighting and ignition (SLI) applications, as well as in electric vehicle (EV) load-leveling, has stimulated product development activities for such high-power devices. The goal is to develop products that can be efficiently charged and then discharged in the time specified for these high-rate applications.

Severe demands are placed on the energy storage system used in an EV. The system must store sufficient energy to provide an acceptable driving range. It must have adequate power to provide acceptable driving performance, notably acceleration rate. In addition, the system must be durable to give years of reliable operation. And finally, the system must be affordable. These four requirements are often in conflict for candidate energy storage technologies. This situation creates significant challenges to developers of EV energy storage systems.

A capacitor offers significant advantages to the EV energy storage system. But to be useful, it must store about 400 Wh of energy, be able to deliver about 40 kW of power for about 10 seconds, provide high cycle-life (>100,000 cycles), and meet specified volume, weight and cost constraints.

Electrochemical capacitors, sometimes called ultracapacitors, or supercapacitors, are of interest in hybrid electric vehicles where they can supplement a battery used in electric cars to provide bursts of power needed for rapid acceleration, the biggest technical hurdle to making battery-powered cars commercially viable. A battery would still be used for cruising, but capacitors (because they release energy much more quickly than batteries) would kick in whenever the car needs to accelerate for merging, passing, emergency maneuvers, and hill climbing. To be cost and weight effective compared to additional battery capacity they must combine adequate specific energy and specific power with long cycle life and meet cost targets, as well.

The energy stored in a charged capacitor can be continuously increased in proportion to the increase of the voltage, limited only by electrical breakdown of the dielectric. The maximum available stored energy, for a given chemical species, is determined by the quantity of electroactive materials, their standard electrode potentials and their equivalent weights, and the power by the reversibility of the electrochemical changes that take place over discharge together with the electrical resistivity of the materials and external circuitry.

Experience with carbon electrode electrochemical capacitors shows that geometrical capacitance calculated from the measured surface area and the width of the dipole layer is not routinely achieved. In fact, for very high surface area carbons, typically only about ten percent of the "theoretical" capacitance seems to be found.

This disappointing performance is related to the presence of micropores and ascribed to wetting deficiencies and/or the inability of a double layer to form successfully in pores in which the oppositely charged surfaces are less than about 20 Å apart. In activated carbons, depending on the source of the carbon and the heat treatment temperature, a surprising amount of surface can be in the form of such micropores (Byrne, J. F. and Marsh, H., "Introductory Overview" in Patrick, J. W., *Porosity in Carbons: Characterization and Applications*, Halsted, 1995).

The performance characteristics of electrochemical capacitors are fundamentally determined by the structural and electrochemical properties of electrodes. Various materials including doped conducting polymer, metal oxides, metal nitrides, and carbon in various forms have been studied for use as electrode materials.

Several methods are known in the art for increasing the amount of energy stored in an electrochemical capacitor. One such method is to increase the surface area of the active electrode. High surface area electrodes result in an increase in storage capacitance and thus increased stored energy. Another approach for increasing stored energy involves using different types of material for fabricating the capacitor's electrodes. Carbon electrodes are used in most commercial capacitors, while precious metal oxide electrodes are used in a the capacitors known as pseudocapacitors.

Electrochemical capacitors containing electrodes fabricated from more than one material (two-component electrodes) are described in a number of references.

U.S. Pat. No. 4,862,328 to Morimoto et al. describes a polarizable electrode for a coin-shaped double layer capacitor composed of a structure of fluorine-containing polymer resin with a fine carbon powder incorporated therein. The structure includes fine nodes of resin connected by fine fibers of the resin. The carbon powder is contained in the nodes. The fluorine-containing polymer resin is about 5 to 30% by weight relative to the fine carbon powder. A sealing material is interposed in the capacitor.

U.S. Pat. No. 5,079,674 to Malaspina provides for an electrode used in supercapacitors composed of two active electrodes bonded to opposite sides of a dielectric separator. The active electrodes consist of metal oxides, chlorides, bromides, sulfates, nitrates, sulfides, hydrides, nitrides, phosphides or selenides coated onto porous carbon particles. The coated particles are bound together in a matrix of a fluorocarbon resin.

U.S. Pat. No. 5,136,473 to Tsuchiya et al. relates to an electric double layer capacitor having at least two polarized electrodes, a separator interposed between the electrodes, and a casing in which the electrodes, separator, and electrolyte are accommodated. The polarized electrodes are composed of two powders of joined minute active carbon particles, the particle of each powder having different diameters.

In U.S. Pat. No. 5,369,546 to Saito et al., the electric double layer capacitor is characterized in that composite materials of activated carbon/polyacene are composed on conductive layers formed on electrical insulating ceramic substrates and a couple of these polarizable electrodes are arranged as facing each other through a separator.

U.S. Pat. No. 5,501,922 to Li et al. relates to a modified carbon electrode for use in an energy storage device made from an activated carbon support having adsorbed thereon a protonated polymer, the polymer having adsorbed therein a polyoxometalate.

U.S. Pat. No. 5,429,893 to Thomas describes an electrochemical capacitor comprising a first electrode fabricated of a carbon-based material, a second electrode fabricated of an inorganic redox material such as Ru, Rh, Pd, Os, Ir, Co, Ni, Mn, Fe, Pt, and alloys and oxides thereof and an electrolyte disposed between the first and second electrodes.

Similarly, U.S. Pat. No. 5,538,813 to Li covers an electrochemical storage device fabricated from two opposing asymmetric electrode assemblies and a solid polymer electrolyte. The first electrode consists of a conducting polymer selected from polyaniline, polypyrrole, polythiophene, polychlorophenylthiophene, polyfluorophenolthiophene and n or p-doped conducting polymer. The second electrode is fabricated from Al, Fe, In, Mn, Mg, Sb, Mo, Cr, Ni, N, V, An, Ru, Ir, Co, Zn, Sn, Bi, Cd, Pd, Ag or alloys or oxides thereof. A polymer electrolyte is dispersed between the electrodes.

U.S. Pat. No. 5,55 7,497 to Ivanov et al. relates to a capacitor comprising an electrolyte, at least one pair of electrolyte-impregnated electrodes, a separator, at least one pair of current collectors, and an uncompressed gasket. The electrolyte-impregnated electrodes are composed of various forms of carbon particles in combination with porous elastic dielectrics and polymer binders.

U.S. Pat. No. 5,581,438 to Halliop describes a double layer capacitor having a housing, a porous separator, an electrolyte, a conductor and electrodes. The electrodes are formed from a current collector positioned against a non-woven web of non-activated carbon fibers impregnated with carbon particles and positioned on either side of a porous layer within a container including a suitable electrolyte.

In order to achieve improved power performance over earlier capacitor devices, NEC developed an activated carbon/carbon composite electrode with a sulfuric acid electrolyte to be used in a supercapacitor. The electrodes are formed from phenol resin, activated carbon powder and PMMA. The phenol resin was used as a binder.

Merryman (at al. of Auburn University also designed a two component electrode. The double layer capacitors are constructed using a composite carbon/metal electrode structure. Large surface area carbon fibers are blended with nickel fibers and a cellulose binder. This mixture is then converted to a paper sheet. A thin foil backing plate is sandwiched between two pieces of the composite paper material. With the nickel fibers sinter-bonded to each other, a conducting path which does not require pressure to achieve low ESR values is formed throughout the carbon bed.

The two-component electrodes described in these patents and references provide improved electric capacity and/or mechanical properties to the electrochemical capacitor as compared to the prior art electrodes. However, many of these electrodes require the presence of a binder or sealer material (in addition to the electrically conductive materials) to hold the electrode components in the desired shape or in the proper orientation. Further, they are not able to provide sufficient electrical capacitance to be used in many high energy applications and only work with certain electrolytes. Moreover, many of the references describe asymmetric two-component electrodes in which the two components are not combined but are present in different electrodes.

Accordingly, there exists a need to provide novel electrochemical capacitors exhibiting greater capacitance using composite electrodes having high accessible surface area, high porosity and reduced or no micropores and being free of the limitations inherent in prior art systems. There also exists the need to provide for a method of producing uniform, symmetrical electrodes which can be used in capacitors to achieve higher operating voltage levels as well as sealing of the completed electrode. Such electrochemical capacitors should have high ionic conductivity, provide high power and high energy, and be fabricated from relatively environmentally benign materials. In addition to high conductivity, it is important that the composite electrodes exhibit high utilization efficiency of expensive active materials, have high structural as well as chemical stability and have improved processibility. Moreover, fabrication of such composite electrodes should be simple, inexpensive, and readily repeatable.

This invention provides fibril composite electrodes for electrochemical capacitors that achieves these results and which overcomes the problems inherent in the prior art.

OBJECTS OF THE INVENTION

It is an object of this invention to provide a composite electrode for an electrochemical capacitor, the composite electrode including carbon nanofibers (fibrils) and an electrochemically active material.

It is also an object of this invention to provide a composite electrode containing carbon fibrils and an electrochemically active material, wherein the carbon fibrils act as an "active consolidator" serving the dual function of exhibiting electrical capacitance and providing a consolidating function for the maintenance of the structural integrity of the electrode.

It is another object of this invention to provide a carbon nanofiber based composite electrode to increase the performance of an electrochemical capacitor.

It is a further object of this invention to surface treat the carbon nanofibers of the composite electrode to modify the Faradaic capacitance.

It is a still further object of this invention to provide a composite electrode containing carbon nanofibers and an electrochemically active material, wherein the carbon nanofibers are functionalized, for use in an electrochemical capacitor.

It is yet another object of this invention to provide improved composite electrodes of industrial value comprising carbon nanofibers and an electrochemically active material, wherein the carbon nanofibers are in a three-dimensional rigid porous carbon structures.

It is an even further object of this invention to provide composite electrodes for use in electrochemical capacitors, the electrodes comprising carbon nanofibers in combination with activated carbon.

It is a another object of this invention to provide composite electrodes for use in electrochemical capacitors, the electrodes comprising carbon nanofibers in combination with metal oxides.

It is still another object of this invention to provide an electrochemical capacitor having two, symmetrical, uniform composite electrodes consisting of carbon nanofibers and an electrochemically active material.

It is also an object of this invention to provide an electrochemical capacitor having two, asymmetrical composite electrodes, both containing carbon nanofibers (fibrils) and an electrochemically active material.

It is a further object of this invention to provide a method of producing a composite electrode comprising carbon nanofibers (fibrils) and an electrochemically active material.

The foregoing and other objects and advantages of the invention will be set forth in or are apparent from the following description.

SUMMARY OF THE INVENTION

This invention relates to composite electrodes comprising carbon nanofibers (fibrils) and an electrochemically active material for use in electrochemical capacitors. The fibrils act as an "active consolidator" exhibiting electrical capacitance as well as providing a structural framework for the electrode. The composite electrodes exhibit improved conductivity, high efficiency with respect to the use of active materials, improved stability and easy processing.

The specific capacitance of the composite electrode can be increased by surface modification, i.e., functionalization of the carbon nanofibers. Nanofibers whose surfaces are uniformly or non-uniformly modified so as to have a functional chemical moiety associated therewith can be used in the composite electrode.

The electrochemically active materials that can be combined with the carbon fibrils to form the composite electrode include: activated carbons, carbon aerogels, carbon foams derived from polymers, oxides, hydrous oxides, carbides, nitrides, and conducting polymers.

This invention also relates to electrochemical capacitors exhibiting improved capacitance and power due to the use of composite electrodes comprising carbon nanofibers (fibrils) and an electrochemically active material.

This invention also relates to a process for preparing the composite electrode which comprises forming the fibril network and then adding the electrochemically active material to the network. Alternatively, the fibril network can be formed simultaneously with the addition of the electrochemically active material incorporated therein.

If the active material to be combined with the carbon fibril network is an oxide, a hydrous oxide, a carbide or a nitride, the process generally includes the steps of dissolving the active material in water, dispersing the nanofibers in water, adding the electrochemically active material to the fibril dispersion, adsorbing or precipitating the active material on the surface of the nano fibers, and filtering and washing the dispersion until a fibril network/active material composite electrode is formed.

If the active material is an activated carbon or a conductive polymer, the activated carbon and the carbon fibrils are separately dispersed (suspended) in water or another solvent. The suspensions are then mixed together and the mixture is filtered and washed to yield a composite electrode.

DETAILED DESCRIPTION OF THE INVENTION

Definition of Terms

Figure 1:
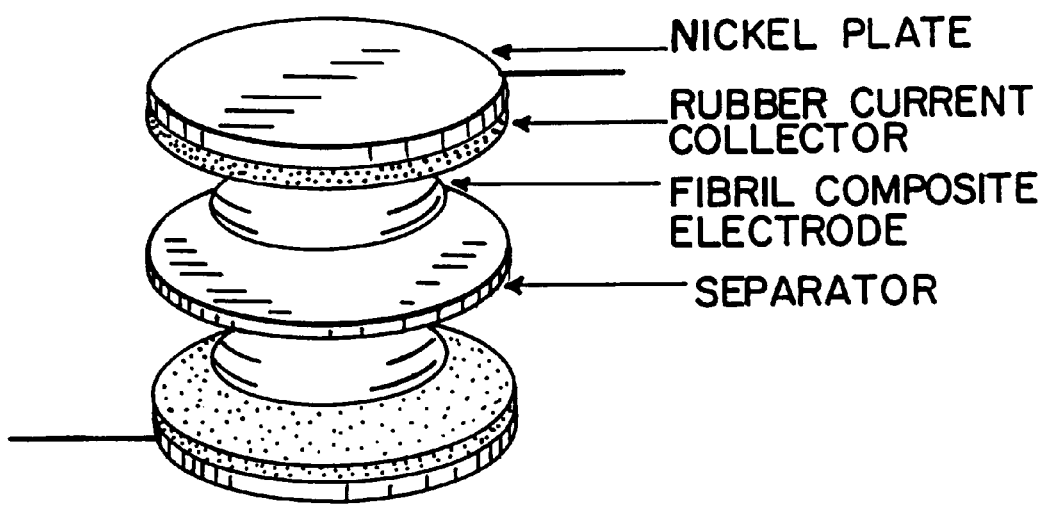
FIG. 1 is an illustration of a composite electrode characterized by scanning electron microscopy (SEM) showing the activated carbon particles connected to the fibril network.
Figure 2:
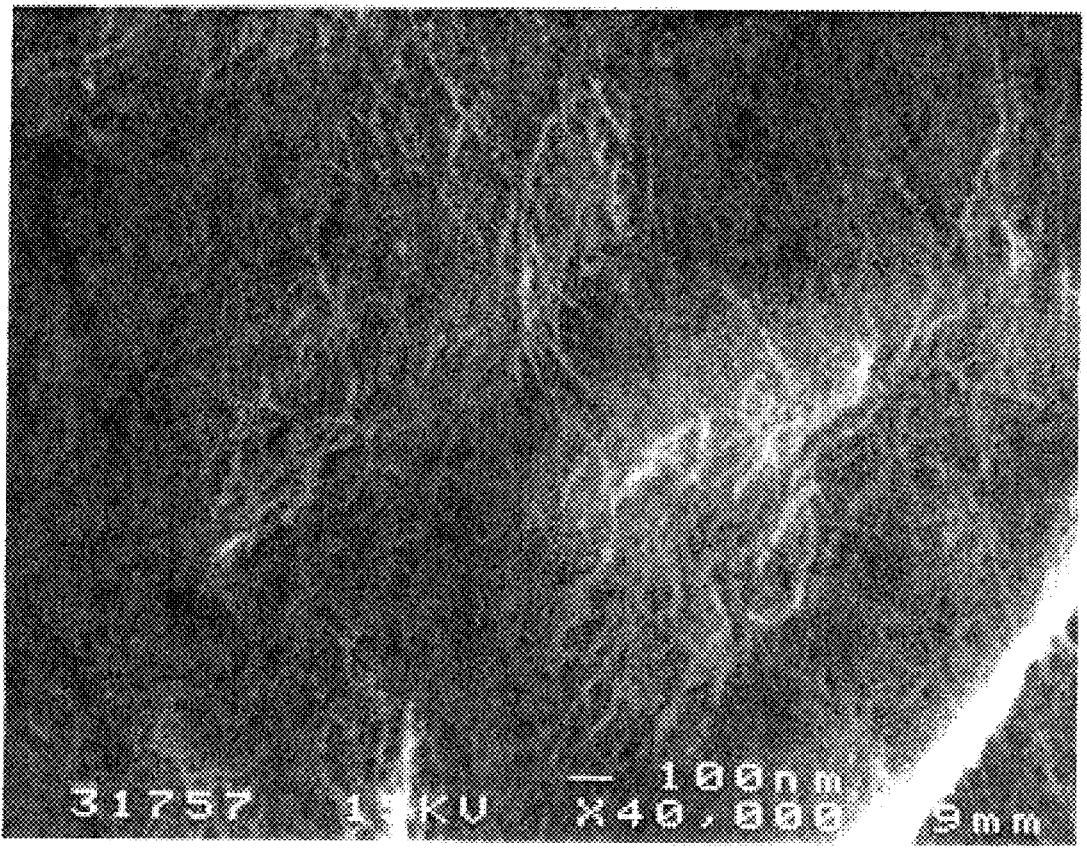
FIG. 2 is a schematic illustration of the single cell test device showing the nickel plate, the rubber current collector, the fibril composite electrode, and the separator.

The term "electrochemically active material" is used in its broadest sense to include any material that provides capacitance in any way, including Faradaic and double layer capacitance.

The term "functional group" refers to groups of atoms that give the compound or substance to which they are linked characteristic chemical and physical properties. A "functionalized" surface refers to a carbon surface on which chemical groups are adsorbed or chemically attached so as to be available for electron transfer with the carbon and for interaction with ions in the electrolyte. Functional groups typically associated with this invention include, but are not limited to, those selected from the group consisting of $-SO_3$, $-R'COX$, $-R'(COOH)_2$, $-CN$, $-R'CH_2X$, $=O$, $-R'CHO$, $-R'CN$, where R' is a hydrocarbon radical and X is $-NH_2$, $-OH$ or a halogen.

"Graphenic" carbon is a form of carbon whose carbon atoms are each linked to three other carbon atoms in an essentially planar layer forming hexagonal fused rings. The layers are platelets only a few rings in diameter or they may be ribbons many rings long but only a few rings wide. There is no order in the relation between layers, few of which are parallel. Many of the spaces between layers are useful pores for electrochemical capacitors.

In "graphitic" carbon the layers are essentially parallel to one another and no more than 3.6 Å apart.

The term "micropore" refers to a pore in which at least one dimension is too small to permit double layer formation or Faradaic processes or ionic diffusion, yet will allow the adsorption of nitrogen (BET accessible).

The term "nanofiber," "nanotube," and "fibril" are used interchangeably. Each refers to elongated structures having a cross section (e.g., angular fibers having edges) or diameter (e.g., rounded) less than 1 micron. The structure may be either hollow or solid.

The term "polymer" refers to a high-molecular-weight materials formed from monomers by any of a number of known methods.

The term "pore" refers to an opening or depression in the surface of a coated or uncoated nanofiber.

The term "pseudocapacitance" and "Faradaic capacitance" are used interchangeably.

The term "pyrolysis" refers to a chemical change in a substance occasioned by the application of heat alone.

The term "surface area" refers to the total surface area of a substance measurable by the BET technique.

The term "thin coating layer" refers to the layer of conducting substance which is deposited on the nanofiber. Typically, the thin coating layer is a carbon layer which is deposited by the application of a polymer coating substance followed by pyrolysis of the polymer.

The invention, as well as other objects and features thereof, will be understood more clearly and fully from the following description.

The Composite Electrodes

The composite electrodes are prepared from carbon nanofibers (fibrils) and electrochemically active materials such as nanoparticles of carbon, conducting polymers, metals, metal oxides, metal nitrides, or metal carbides. The fibrils in the composite electrode act in a dual capacity as an "active consolidator". They are both a good electrical capacitor in their own right and at the same time "consolidate" or structurally support the electrode.

The fibril mat may be prepared first and then the active material incorporated into the fibril network (via chemical vapor deposition or impregnation). Alternatively, the fibril network may be formed simultaneously with the addition of the electrochemically active substance.

Nanofiber networks may be prepared with or without surface treatment and in various structural forms, i.e. aggregates and mats, as described below. Preferably they are treated to introduce chemical functional groups onto their surfaces. After filtration, washing and drying, the functionalized carbon nanotubes are dispersed in water and then filtered to yield a carbon nanofiber mat. After drying and cross-linking, a rigid carbon nanotube electrode is formed. Nanoparticles of electrochemically active materials can then be combined with the fibrils.

Examples of preferred electrochemically active materials include: activated carbon (including all high surface area activated carbons) such as Nuchar SA, SA-20, SA-30 from Westvaco Corporation, and C-30 and M-30 from Spectracorp, carbon aerogels, and carbon foams derived from polymers; oxides and hydrous oxides such as $RuO_2$, $IrO_2$, NiO, $MnO_2$, $VO_x$, $PbO_2$, and $Ag_2O$; carbides and nitrides such as $MoC_x$, $MO_2N$, $WC_x$ and $WN_x$; and conducting polymers such as polyaniline, polypyrrole, polythiophene, and their derivatives.

The process used to prepare the composite electrode depends on the active material incorporated into the fibril matrix. The composite electrodes may be prepared by the sol-gel method wherein the electrodes are assembled by simple filtration of slurries of the composite. Thickness is controlled by the quantity of material used and the geometry, assuming the density of the material is known based on experience.

Where the active material to be combined with the carbon fibril network is an oxide, a hydrous oxide, a carbide or a nitride, the process includes the steps of dissolving the active material in water, dispersing the nanofibers in water, adding the active material solution to the fibril dispersion, adsorbing or precipitating the active material on the surface of nanofibers after dispersion, and filtering and washing the dispersion until a fibril mat/active material composite is obtained. Where the electrochemically active material is an oxide, a further step of adjusting the pH of the active material/fibril dispersion prior to filtration may be required.

Where the active material is activated carbon or conducting polymer, the material (activated carbon) is heated with an acid to remove inorganic impurities, if necessary. The acid washed activated carbon and the fibrils are each separately dispersed in water. A small amount of surfactant such as Triton-100 may be added to the activated carbon dispersion. The fibril dispersion and the activated carbon dispersion are then mixed together. After sonication, the mixture is filtered and washed to yield a composite electrode comprising a fibril mat and an electrochemically active material.

The composite electrodes can be assembled into electrochemical capacitors to be used as energy storage devices. The electrochemical capacitors generally consist of two electrodes separated by a dielectric such as an electrolyte. Typical nonaqueous electrolytes include tetraethylammonium salts, tetramethylammonium salts, and hexafluorophosphate ($EMIBF_6$). Typical solvents for nonaqueous electrolytes include propylenecarbonate, ethylene carbonate, and dimethyl carbonate. Typical aqueous electrolytes are sulfuric acid ($H_2SO_4$) and potassium hydroxide (KOH).

The structure of the electrode depends, in part, on the amount of carbon nanofibers (fibrils) in the composite. With high fibril content, the composite electrodes generally consist of a three dimensional network of fibrils with the electrochemically active matrix materials deposited on the surface of the fibril network. With low fibril content, the fibrils of the composite electrode are generally dispersed in the electrochemically active matrix material.

The fibrils in the composite electrode act as an "active consolidator". The fibrils exhibit good electrical capacitance in their own right and also serve as a "consolidator" maintaining the structure of the electrode and providing a framework for the electrochemically active materials.

The fibril composite electrodes have an unique structure: a nanowire-like fibril network uniformly dispersed in a matrix of electrochemically active materials or nanoparticles of active material uniformly distributed on a fibril network. A number of important advantages result from the unique structure of the fibril composite electrodes. These advantages include:

a) Fibrils as an "Active Consolidator"

The presence of the fibrils as one component of a two-component electrode serves two important functions. First, the fibrils are electrically conductive and exhibit good capacitance in their own right. Second, the fibril network has a structural function and acts a consolidator which holds or "binds" the electrode materials together without the need for an intermediate binder.

b) High Conductivity

Particles of activated materials are connected together by a highly conductive fibril network. The electrodes, therefore, have high conductivity. High electrode conductivity is essential for high power electrochemical capacitors. The carbon fibril network directly contacts the primary particles of active materials which increases the rate of electron transfer, and, subsequently, the rate of the electrochemical reaction. Hence, high power electrochemical capacitors or batteries can be made using the fibril composite electrodes.

c) High Utilization Efficiency of Active Materials

Active materials, such as $RuO_2$, can be supported on a fibril mat with nanometer dispersion. This improves the rate of access to atoms in the bulk, thereby improving the efficiency of the active materials. Dispersion of nanoparticles of active material on the surface of the fibril network allows the active material to be readily accessible (available) for electrochemical reactions. This is extremely important for active materials, such as $RuO_2$, which are very expensive.

d) High Structural and Chemical Stability

The three dimensional fibril network offers a solid support structure for active materials. In addition, the nanoparticles of active materials anchored on the fibril network surface are less susceptible to agglomeration or participation in unwanted chemical reactions.

e) Improved Processibility

In addition to an active component in a composite electrode, the nanofibers also function as a consolidating material. The nanofibril composite materials can be easily made into sheet electrodes. A recognized problem in the art is the difficulty of preparing sheet electrodes for many electrode materials. The use of a composite electrode consisting of electrode materials incorporated into a fibril network structure could make it easier to prepare an electrode in the form of a sheet.

f) Improved Stability

The composite electrodes are stable in a variety of electrolytes and do not corrode upon contact with $H_2SO_4$.

Nanofibers in Composite Electrodes

The use and applicability of carbon fibrils as the active material in an electrode for capacitor is described in U.S. patent application Ser. No. 08/856,657 filed on May 15, 1997, claiming priority to Provisional Application No. 60/017,609 filed May 15, 1996 (370077-3600), incorporated herein by reference. The fibril based electrodes exhibited narrow pore size distribution, high accessible surface area, controllable density, and high structural stability which are almost impossible to obtain with activated carbon or carbon fibers. In addition, the capacitors made from the carbon nanofiber electrodes had excellent frequency response and increased power density.

The electrodes in a capacitor can be identical to form a symmetrical diffuse double layer capacitor. In other words, the fibril mats can be functionalized with the same functional group (or identically oxidized) to form symmetrical electrodes. The diffuse double layer forming an extremely small effective plate separation is created naturally at the electrode-electrolyte interface when voltage is applied.

Thus, a polarized double layer is formed at each electrode comprising millions of tiny plates separating electric charge.

The electrodes can also be asymmetrical, meaning that the nanofiber mats can be functionalized with different functional groups to form asymmetrical electrodes with different Faradaic characteristics. Advantageously, one of the nanofiber electrodes has a redox voltage near zero (normal hydrogen electrode, NHE). Such an asymmetrical Faradaic pseudocapacitor can store up to four times the energy of a purely double layer capacitor when the initial voltage is the difference between the redox potentials of its functional groups. This is because the average voltage of the double layer capacitor is one half of that initial voltage if discharge goes to zero volts and because the two electrodes of a double layer capacitor device act as two separate capacitors connected in series. Hence, the voltage across each is only one half the voltage across the device.

One fundamental advantage of nanofiber based electrochemical capacitors is the exceptional amount of available surface area (e.g., 200 $m^2/gm$) due to of the total absence of micropores. Thus, what one seeks is 100% utilization of 200 $m^2/gm$ surface area versus poorer utilization of the larger specific surface typical of most carbon based electrodes.

A multicell stack of fibril electrodes can be created and may be joined together by an electrical connection to create a high energy density electrochemical capacitor device. Individual capacitor electrodes are electrically isolated from one another by an electrically nonconductive, but ionically conductive, separator. Electrical nonconductivity is essential in order to maintain intracell voltage differences. In addition, the separator must be sufficiently porous to facilitate ionic conduction, a major component of the internal electrochemical capacitor resistance.

Instead of stacking the electrodes to create a multicell stack, the electrodes can be lengthened and wound in a "jelly-roll" to provide a high energy density electrochemical capacitor device.

The nanofibers may be surface treated to modify the Faradaic contribution at the nanofiber stage and then assembled into electrode mats by simple filtration. This is in contrast to aerogels, and other high surface area carbons which, once formed, are difficult to derivatize internally.

The electrodes may comprise nanofibers which are coated with a very thin porous layer of a pyrolyzed carbonaceous polymer. Heat is applied to the thin polymer layer to pyrolyze non-carbon constituents of the polymer, leaving "holes" in the polymer where these non-carbon substituents previously were. The holes left by the pyrolysis of the non-carbon polymer constituents effectively create increased surface area. The effective surface area of the nanofiber may be further increased by the process known as "activation". Such high surface area nanofibers and methods of making them are set forth in U.S. patent application Ser. No. 08/854,918, filed on May 15, 1997, claiming priority to Provisional Application No. 60/017,787 filed on May 15, 1996 (CMS Docket No. 370077-3630) entitled "High Surface Area Nanofibers, Methods of Making, Methods of Using and Products Containing Same" by Howard Tennent, David Moy and Chun-Ming Niu, hereby incorporated by reference.

Because, ideally, only surface groups are involved, the charge/discharge event is rapid and excessive molecular rearrangement which may lead to physical instability is avoided. Thus, the power density and life advantage of the electrochemical capacitor is preserved despite similarities to the mechanism and energy density regime of batteries.

The electrodes may also comprise nanofibers in the form of a rigid porous structure comprising intertwined carbon nanofibers. The rigidity of the nanofibers are improved by causing the nanofibers to form bonds or become glued with other nanofibers at the fiber intersections. The bonding can be induced by chemical modifications of the surface of the nanofibers to promote bonding, by adding "gluing" agents and/or by pyrolyzing the nanofibers to cause fusion or bonding at the interconnect points. Such structures and methods of making them are set forth in U.S. patent application Ser. No. 08/857,383 filed on May 15, 1997, claiming priority to Provisional Application No. 60/020,804 filed on May 15, 1996 (CMS Docket No. 370077-3480) entitled "Rigid Porous Carbon Structures, Methods of Making, Methods of Using and Products Containing Same" by Howard Tennent, David Moy and Chun-Ming Niu, hereby incorporated by reference.

The specific capacitance of fibrils may be increased several fold in two ways: (1) by increasing the effective surface area by coating the fibrils with a very thin porous layer of a pyrolyzed carbonaceous polymer which can be functionalized with high concentrations of redox groups; and (2) by incorporating therein (separately) such groups with strongly oxidizing or reducing potential.

Ideally, unlike a conventional battery, the redox reactions at or near the surface of the electrodes do not involve a phase change. In a conventional battery, a conversion from one oxidation state to another proceeds ideally at a singular potential until virtually all of one phase is converted to another (see B. E. Conway "Transition from 'Supercapacitor' to 'Battery' Behavior in Electrochemical Energy Storage," J. Electrochem. Soc. Vol. 138, No. 6, June 1991, incorporated herein by reference). Essentially this will result in a hybrid between a pure capacitor and a rechargeable battery.

Nanofibers

Nanofibers may be used in the electrochemical capacitors of the invention in various geometries. They may be present as dispersed fibrils, as aggregates or as mats or films. They may be attached to larger supports, or mixed with other materials. Nanofibers primarily consist of chemically-modifiable graphitic carbon. They generally have diameters no greater than 0.1 $\mu$m and length to diameter ratios of at least 5. Typically, they have diameters of 0.01 $\mu$m and lengths of 1–10 $\mu$m.

Since the 1970s graphitic nanofibers and fibrils have been identified as materials of interest for a variety of applications. Submicron graphitic nanofibers are sometimes called vapor grown carbon fibers. Carbon nanofibers are vermicular carbon deposits having diameters less than $1.0\mu$, preferably less than $0.5\mu$, and even more preferably less than $0.2\mu$. They exist in a variety of forms and have been prepared through the catalytic decomposition of various carbon-containing gases at metal surfaces. Such vermicular carbon deposits have been observed almost since the advent of electron microscopy. An early survey and reference is found in Baker and Harris, *Chemistry and Physics of Carbon*, Walker and Thrower ed., Vol. 14, 1978, p. 83. See also, Rodriguez, N., *J. Mater. Research*, Vol. 8, p. 3233 (1993).

In 1983, Tennent, U.S. Pat. No. 4,663,230, succeeded in growing cylindrical ordered graphite cores, substantially uncontaminated with pyrolytic carbon. Tennent provided access to smaller diameter fibrils, typically 35 to 700 Å (0.0035 to $0.070\mu$) and to an ordered, "as grown" graphitic surface. Fibrillar carbons of less perfect structure, but also without a pyrolytic carbon outer layer have also been grown.

Fibrils, buckytubes and nanofibers are distinguishable from continuous carbon fibers commercially available as reinforcement materials. In contrast to fibrils, which have, desirably large, but unavoidably finite aspect ratios, continuous carbon fibers have aspect ratios (L/D) of at least $10^4$ and often $10^6$ or more. The diameter of continuous fibers is also far larger than that of fibrils, being always >$1.0\mu$ and typically 5 to $7\mu$.

Continuous carbon fibers are made by the pyrolysis of organic precursor fibers, usually rayon, polyacrylonitrile (PAN) and pitch. Thus, they may include heteroatoms within their structure. The graphitic nature of "as made" continuous carbon fibers varies, but they may be subjected to a subsequent graphitization step. Differences in degree of graphitization, orientation and crystallinity of graphite planes, if they are present, the potential presence of heteroatoms and even the absolute difference in substrate diameter make experience with continuous fibers poor predictors of nanofiber chemistry.

Tennent, U.S. Pat. No. 4,663,230 describes carbon fibrils that are substantially free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than $0.1\mu$ and length to diameter ratios of at least 5. Desirably they are substantially free of a continuous thermal carbon overcoat, i.e., pyrolytically deposited carbon resulting from thermal cracking of the gas feed used to prepare them.

Tennent et al., U.S. Pat. No. 5,171,560, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanofibers of substantially constant diameter and comprise cylindrical graphitic sheets whose c-axes are substantially perpendicular to their cylindrical axis. They are substantially free of pyrolytically deposited carbon, have a diameter less than $0.1\mu$ and a length to diameter ratio of greater than 5. These fibrils are of primary interest in the invention.

Fibril aggregates are disclosed in Snyder et al., U.S. patent application Ser. No. 149,573, filed Jan. 28, 1988, and PCT Application No. US89/00322, filed Jan. 28, 1989 ("Carbon Fibrils") WO 89/07163, and Moy et al., U.S. patent application Ser. No. 413,837 filed Sep. 28, 1989 and PCT Application No. US90/05498, filed Sep. 27, 1990 ("Fibril Aggregates and Method of Making Same") WO 91/05089, all of which are assigned to the same assignee as this invention.

Moy et al., U.S. Ser. No. 07/887,307 filed May 22, 1992, describes aggregates having various macroscopic morphologies (as determined by scanning electron microscopy) in which they are randomly entangled with each other to form entangled balls of fibrils resembling bird nests ("BN"); or as aggregates consisting of bundles of straight to slightly bent or kinked carbon fibrils having substantially the same relative orientation, and having the appearance of combed yarn ("CY") e.g., the longitudinal axis of each fibril (despite individual bends or kinks) extends in the same direction as that of the surrounding fibrils in the bundles; or, as, aggregates consisting of straight to slightly bent or kinked fibrils which are loosely entangled with each other to form an "open net" ("ON") structure. In open net structures the degree of fibril entanglement is greater than observed in the combed yarn aggregates (in which the individual fibrils have substantially the same relative orientation) but less than that of bird nests. CY and ON aggregates are more readily dispersed than BN making them useful in composite fabrication where uniform properties throughout the structure are desired.

Geus, U.S. Pat. No. 4,855,091, provides a procedure for preparation of fishbone fibrils wherein the projection of the graphitic layers on the fibril axis extends for a distance of less than two fibril diameters, the carbon planes of the graphitic nanofiber, in cross section, having a herring bone appearance. These are termed fishbone fibrils. They are substantially free of a pyrolytic overcoat. These fibrils are also useful in the practice of the invention.

Carbon nanotubes of a morphology similar to the catalytically grown fibrils described above have been grown in a high temperature carbon arc (Iijima, Nature 354 56 1991). It is now generally accepted (Weaver, Science 265 1994) that these arc-grown nanofibers have the same morphology as the earlier catalytically grown fibrils of Tennent. Arc grown carbon nanofibers are also useful in the invention.

Fibrils have dimensions and morphologies similar to the nanotubes reported by S. Iijima, Nature 354, 56 (1991) and S. Iijima, T. Ichihashi, and Y. Ando, Nature 356, 776 (1992), made by an electric arc process and more recently made catalytically by S. Amelinckx, et al., Science 265, 635 (1994).

In contrast to arc grown tubules, vapor grown fibrillar carbons are produced as free flowing aggregates uncontaminated with amorphous carbon or other graphitic non-tube structures. The porosity of aggregates is extremely high. These aggregates can be dispersed and reassembled into macrostructures composed of interconnected fibril nanotubes, similar to felt fiber mats.

Carbon nanotubes can be oxidized to yield high surface concentrations of oxygen-containing groups (Bening et al. PCT/U.S. 90/02667 published as WO 90/14221 on Nov. 29, 1990; McCarthy, T. and Bening, R., Polymer Preprints, 30(1), 420 (1990)). These oxidized nanotubes are readily and highly dispersible in polar solvents and form mats with densities as high as about 1.0 g/cc. Their acidic functionalities are also convertible by conventional organic reactions to virtually any desired secondary functional group, thereby providing a wide range of surface hydrophilicity or hydrophobicity.

The walls of the carbon nanofibers may be formed from a single layer of carbon atoms. These single layer fibers are used to assemble structures with low density and high surface to volume ratios with extremely small diameters. They are also substantially free of pyrolytically deposited carbon.

Fibrils are electrically conductive. While the conductivity of individual fibrils is difficult to measure, one attempt (Whitesides, G. and Weisbacher, C. S., "Measurement of the Conductivity of Individual Carbon Nanotubes", presented at MRS Meeting, San Francisco, 1994) has yielded an estimated resistivity value of 9.5 ($\pm 4.5$)$\times 10^{-3}$ scm, a resistivity slightly higher than typically measured for graphinized carbon. When compressed into mat electrodes, careful measurements of the resistivity as a function of temperature give a value of $24 \times 10^{-3}$ $\Omega$cm, at room temperature.

Because of their small diameter, fibrils have a surface area of about 200 $m^2/g$ as determined by BET measurement. The value for the surface area can also be arrived at by calculation based on average fibril dimensions. This agreement between calculation and the BET measurement demonstrates that the 200 $m^2/g$ is all on the external surface of the fibrils. Analytical electrochemistry of fibril mat electrodes demonstrates that all of the fibril surface area is available for electrochemical processes. For example, the double layer charging capacitance of fibril mat electrodes varies linearly with the mass of fibrils in the electrode over a wide range of fibril mat densities.

Modified Nanofibers The specific capacitance of nanotube electrodes can be further increased by surface modification. Advantageously, the nanofibers are functionalized nanofibers, i.e. nanofibers whose surfaces are uniformly or non-uniformly modified so as to have a functional chemical moiety associated therewith. The nanofiber surfaces may be functionalized by reaction with oxidizing or other chemical media. The nanofiber surfaces may be uniformly modified either by chemical reaction or by physical adsorption of species which themselves have a chemical reactivity. The nanofiber surfaces may be modified e.g. by oxidation and may be further modified by reaction with other functional groups. The nanofiber surfaces may be modified with a spectrum of functional groups so that the nanofiber can be chemically reacted or physically bonded to chemical groups in a variety of substrates.

Complex structures of nanofibers may be obtained by linking functional groups on the fibrils with one another by a range of linker chemistries.

Functionalized nanofibers and methods of making them are set forth in U.S. patent application Ser. No. 08/352,400 filed on Dec. 8, 1994 for FUNCTIONALIZED NANOTUBES, hereby incorporated by reference.

McCarthy et al., U.S. patent application Ser. No. 351,967 filed May 15, 1989, describes processes for oxidizing the surface of carbon fibrils that include contacting the fibrils with an oxidizing agent that includes sulfuric acid ($H_2SO_4$) and potassium chlorate ($KClO_3$) under reaction conditions (e.g., time, temperature, and pressure) sufficient to oxidize the surface of the fibril. The fibrils oxidized according to the processes of McCarthy, et al. are non-uniformly oxidized, that is, the carbon atoms are substituted with a mixture of carboxyl, aldehyde, ketone, phenolic and other carbonyl groups.

Nanofibers have also been oxidized non-uniformly by treatment with nitric acid. International Application PCT/US94/10168 discloses the formation of oxidized fibrils containing a mixture of functional groups. Hoogenvaad, M. S., et al. ("Metal Catalysts supported on a Novel Carbon Support", Presented at Sixth International Conference on Scientific Basis for the Preparation of Heterogeneous Catalysts, Brussels, Belgium, September 1994) also found it beneficial in the preparation of fibril-supported precious metals to first oxidize the fibril surface with nitric acid. Such pretreatment with acid is a standard step in the preparation of carbon-supported noble metal catalysts, where, given the usual sources of such carbon, it serves as much to clean the surface of undesirable materials as to functionalize it.

The nanofibers are preferably functionalized nanofibers which broadly have the formula

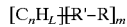

where n is an integer, L is a number less than 0.1 n, m is a number less than 0.5 n, each of R is the same and is selected from $SO_3H$, COOH, $NH_2$, OH, O, CHO, CN, COCl, halide, COSH, SH, R', COOR', SR', $SiR'_3$, $Si-(OR')_yR'_{3-y}$, $Si-(O-SiR'_2)-OR'$, R", Li, $AlR'_2$, Hg-X, $TlZ_2$ and Mg-X, y is an integer equal to or less than 3, R' is alkyl, aryl, heteroaryl, cycloalkyl aralkyl or heteroaralkyl, R" is fluoroalkyl, fluoroaryl, fluorocycloalkyl, fluoroaralkyl or cycloaryl, X is halide, and Z is carboxylate or trifluoroacetate.

The carbon atoms, $C_n$, are surface carbons of the nanofiber.

The nanofibers also include non-uniformly substituted nanofibers. Also included are functionalized nanofibers having the formula

where n, L, m, R' and R have the same meaning as above.

In both uniformly and non-uniformly substituted nanofibers, the surface atoms $C_n$ are reacted. Most carbon atoms in the surface layer of a graphitic nanofiber, as in graphite, are basal plane carbons. Basal plane carbons are relatively inert to chemical attack. At defect sites, where, for example, the graphitic plane fails to extend fully around the nanofiber, there are carbon atoms analogous to the edge carbon atoms of a graphite plane (See Urry, *Elementary Equilibrium Chemistry of Carbon*, Wiley, New York 1989.) for a discussion of edge and basal plane carbons).

At defect sites, edge or basal plane carbons of lower, interior layers of the nanofiber may be exposed. The term surface carbon includes all the carbons, basal plane and edge, of the outermost layer of the nanofiber, as well as carbons, both basal plane and/or edge, of lower layers that may be exposed at defect sites of the outermost layer. The edge carbons are reactive and must contain some heteroatom or group to satisfy carbon valency.

The substituted nanofibers described above may advantageously be further functionalized. Such compositions include compositions of the formula $[C_nH_L]A_m$ where the carbons are surface carbons of a nanofiber, n, L and m are as described above, A is selected from

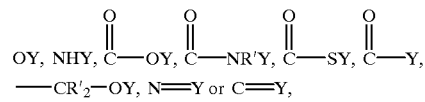

Y is an appropriate functional group of a protein, a peptide, an enzyme, an antibody, a nucleotide, an oligonucleotide, an antigen, or an enzyme substrate, enzyme inhibitor or the transition state analog of an enzyme substrate or is selected from R'—OH, R'—$NH_2$, R'SH, R'CHO, R'CN, R'X, $R'SiR'_3$, $R'Si-(OR')_yR'_{3-y}$, $R'Si-(O-SiR'_2)-OR'$, R'—R", R'—N—CO, $(C_2H_4O)_w$—H, $(C_3H_6O)_w$—H, $(C_2H_4O)_w$—R', $(C_3H_6O)_w$—R' and R', and w is an integer greater than one and less than 200.

The functional nanofibers of structure

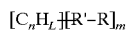

may also be functionalized to produce compositions having the formula

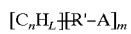

where n, L, m, R' and A are as defined above.

The electrodes of the invention also include nanofibers upon which certain cyclic compounds are adsorbed. These include compositions of matter of the formula

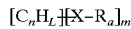

where n is an integer, L is a number less than 0.1 n, m is less than 0.5 n, a is zero or a number less than 10, X is a polynuclear aromatic, polyheteronuclear aromatic or metallopolyheteronuclear aromatic moiety and R is as recited above.

Preferred cyclic compounds are planar macrocycles as described on p. 76 of Cotton and Wilkinson, *Advanced Organic Chemistry*. More preferred cyclic compounds for adsorption are porphyrins and phthalocyanines.

The adsorbed cyclic compounds may be functionalized. Such compositions include compounds of the formula $$[C_nH_L][X-A_a]_m$$

where m, n, L, a, X and A are as defined above and the carbons are surface carbons of a substantially cylindrical graphitic nanofiber as described above.

The carbon nanofibers functionalized as described above may be incorporated in a matrix. Preferably, the matrix is an organic polymer (e.g., a thermoset resin such as epoxy, bismaleimide, polyamide, or polyester resin; a thermoplastic resin; a reaction injection molded resin; or an elastomer such as natural rubber, styrene-butadiene rubber, or cis-1,4-polybutadiene); an inorganic polymer (e.g., a polymeric inorganic oxide such as glass), a metal (e.g., lead or copper), or a ceramic material (e.g., Portland cement).

Functional groups may be introduced onto the surface of carbon nanofibers by contacting carbon nanofibers with a strong oxidizing agent for a period of time sufficient to oxidize the surface of said nanofibers and further contacting said nanofibers with a reactant suitable for adding a functional group to the oxidized surface. Preferably, the oxidizing agent is comprised of a solution of an alkali metal chlorate in a strong acid. In other embodiments the alkali metal chlorate is sodium chlorate or potassium chlorate. In preferred embodiments the strong acid used is sulfuric acid. Periods of time sufficient for oxidation are from about 0.5 hours to about 24 hours.

A network of carbon nanofibers are produced by contacting carbon fibrils with an oxidizing agent for a period of time sufficient to oxidize the surface of the carbon nanofibers, contacting the surface-oxidized carbon nanofibers with reactant suitable for adding a functional group to the surface of the carbon nanofibers, and further contacting the surface-functionalized nanofibers with a cross-linking agent effective for producing a network of carbon nanofibers. A preferred cross-linking agent is a polyol, polyamine or polycarboxylic acid.

The functionalized nanofibers may also be in the form of rigid networks of nanofibers. A well-dispersed, three-dimensional network of acid-functionalized nanofibers may, for example, be stabilized by cross-linking the acid groups (inter-fibril) with polyols or polyamines to form a rigid network.

The nanofiber particles also include three-dimensional networks formed by linking functionalized nanofibers of the invention. These complexes include at least two functionalized nanofibers linked by one or more linkers comprising a direct bond or chemical moiety. These networks comprise porous media of remarkably uniform equivalent pore size.

Although the interstices between these nanofibers are irregular in both size and shape, they can be thought of as pores and characterized by the methods used to characterize porous media. The size of the interstices in such networks can be controlled by the concentration and level of dispersion of nanofibers, and the concentration and chain lengths of the cross-linking agents.

Methods for chemical modification of nanofiber surfaces and methods for physically adsorbing species on the surfaces of nanofibers are described herein to provide, in each case, a functional moiety associated with the surface of the nanofiber. The functionalized nanofibers of the invention can be directly prepared by sulfonation, electrophilic addition to deoxygenated nanofiber surfaces or metallation. When arc grown nanofibers are used, they may require extensive purification prior to functionalization. Ebbesen et al. (Nature 367 519 (1994)) give a procedure for such purification.

Preferably, the carbon nanofibers are processed prior to contacting them with the functionalizing agent. Such processing may include dispersing the nanofibers in a solvent. Oxidized fibrils are more easily dispersed in aqueous media than unoxidized fibrils. Functionalized fibrils are ideal since they are easily dispersed in aqueous or polar media and the functionality provides cross-link points. The carbon nanofibers may be filtered and dried prior to further processing. Stable, porous 3-dimensional structures with meso- and macropores (pores >2 nm) are useful in the invention. Since fibrils can be dispersed on an individualized basis, a well-dispersed sample which is stabilized by cross-links allows one to prepare such a structure.

To prepare a Faradaic electrode with redox potential near zero (NHE), surface groups are introduced that have a redox potential near zero. Such surface groups advantageously include disulfides and quaternary amines. The sulfides or appropriate amines are advantageously adsorbed or precipitated in the presence of fibrils, before assembly into mats.

Measurement of Capacitance of Nanofiber Electrodes

The Measurement Device

A test device was assembled to resemble a capacitor. FIG. 1 shows a schematic diagram of the device. In most cases, the test devices had two identical carbon nanofibril electrodes (typically, 0.5" diameter and 0.002" thick), separated by a 0.001" thick polymer separator using 38wt % $H_2SO_4$ as the electrolyte. Occasionally, 4 M KOH was used as the electrolyte. A conducting rubber was used as the current collectors. The rubber sheets also protected the nickel plates from $H_2SO_4$ corrosion. The equivalent series resistance (E.S.R.) was measured at 1 kHz at 0 V bias. Capacitance was measured by a constant current charging method. The composite electrodes were wetted easily by the sulfuric acid electrolyte. The E.S.R. of the test cell was approximately 0.1 ohms. It remained stable throughout the evaluation. The capacitance generally reached a stable state after the second charging.

Measurements

A number of different composite electrodes were prepared in accordance with the procedures outlined in the Examples provided below. For each composite electrode prepared in the Examples, the electrode thickness, the electrode density (g/cm³), the equivalent series resistance of a test capacitor (E.S.R.), the specific capacitance of the electrode ($C_P$) and the device capacitance ($C_D$) based on the wet weight of electrodes (2×dry weight) were measured (see Table 1). Under the $C_P$ column (specific capacitance of the electrode), 5 mA and 10 mA are the constant charge current used for the test. In the column labeled "Type" in Table 1, the abbreviation O-CC represents nitric acid oxidized CC-fibrils.

The procedures for preparing composite electrodes 211-6-1 to 211-8-1, 211-10-1, 211-14-1, 211-19-1, 211-24-1, and 211-31-1 are described in Example 2. Nitric acid treated CC fibrils and activated carbon (Nuchar SN-20, Westvaco Corp.) were used. The ratio of oxidized fibril to activated carbon and the final treatment temperature are listed under the "Type" column. Electrode sample 211-31-1 was heated under argon; all others were heated in air. The electrode 211-4-1 was prepared by the same method, except Nuchar SN-20 was used as received.

The samples of 211-18-1, 211-21-1, 216-26-1, 216-30-1 and 216-50-1 were prepared using different activated carbons by using the same procedure as outlined in Example 2. The activated carbons were nitric acid treated fishbone fibrils (diameters ~30 nm), $CO_2$-treated fishbone fibrils, C-30 and M-30, for 211-18-1 and 211-21-1, 216-50-1, 216-26-1, and 216-30-1, respectively. Both C-30 and M-30 were obtained from Spectracorp and used as received.

The preparation procedures for the composite electrodes of 211-72-1 and 216-5-1 are described in Examples 3 and 4, respectively. The procedure for preparing electrode 216-27-1 is described in Example 6 and the procedure for preparing composite electrode 205-66-1 is described in Example 1.

EXAMPLES

The following examples are illustrative of some of the products and methods of making the same falling within the scope of the invention. They are not to be considered in any way limitative of the invention. Numerous changes and modifications can be made with respect to the invention.

See Table 1, Book No. 205-66-1.

Example 1
FIBRIL-$R_uO_2xH_2O$ Composite Electrodes

The electrodes were prepared by a sol-gel method, 15 mg of $RuCl_3xH_2O$ (Aldrich, used as received) was dissolved in 10 cc water. 50 mg oxidized Hyperion carbon nanofibers were dispersed into 100 cc water. The solution of $RuCl_3xH_2O$ was added drop by drop to the fibril dispersion as it was stirred rigorously. A 0.1 M NaOH solution was added to the $RuCl3xH_2O$/fibril dispersion until pH of 7 was achieved. The dispersion was filtered and washed until a mat with the diameter of 1.5" was obtained. After heating at 170° C. in air for 12 hours, the mat was tested as an electrode for electrochemical capacitors.

Two electrodes with weights of 5.31 and 5.32 mg, and diameters of 0.5" were prepared from the mat. A single cell electrochemical capacitor was fabricated with these electrode separated by a 0.001" thick polymer separator using 38% $H_2SO_4$ as the electrolyte. The specific capacitance for the composite electrode measured by a constant current charge method was 249 F/g. The test results are shown in Table 1, Book No. 205-66-1.

Example 2
Fibril-Activated Carbon Composite Electrodes

Activated carbon (SN-20) obtained from Westvaco corporation was treated with 60% nitric acid to remove inorganic impurities. 0.267 g acid washed activated carbon was ground with a marble agitate mortar for 15 minutes. A composite electrode with the ratio of activated carbon to fibrils of 2/1 was prepared by following steps. 0.267 g acid-washed activated carbon and 0.133 g oxidized Hyperion CC fibrils were each separately dispersed in 150 cc water. 5 drops of Triton-100 was then added to the activated carbon dispersion. The two dispersions were then mixed together. After sonication for 5 minutes with a 500 w ultrasound dispenser, the mixture was filtered, and washed, to yield a 3.5" diameter mat. The mat was heated at 350° C. in air for 4 hours.

Electrodes with ratios of activated carbon to fibrils of 1/1 and 1/3 were also prepared by the same procedure.

The electrodes were characterized by SEM. As shown in FIG. 1, the activated carbon particles are connected by a fibril network. The testing of the capacitance of the electrodes was carried out using the test device described above. The results are summarized in Table 1.

Example 3
Fibril-Activated Carbon Composite Electrodes 10 g of Hyperion CC fibrils and 20 g acid-washed Nuchar SN-20 (Westvaco were mixed using a ball mill. A 3.5" diameter mat was made by dispersing 0.15 g of a mixture of fibrils and activated carbon in 100 cc $H_2O$ and then filtering, drying the filtered mat at 120° C. and finally heating the mat at 350° C. in air. The mat had a thickness of 0.0019", a density of 0.58 g/cc and a specific capacitance of 139.4 F/g. The results are summarized in Table I, Book log: 211-72-1.

Example 4
Fibril-Activated Carbon Composite Electrodes 10 g oxidized Hyperion fibrils and 20 g acid washed Nuchar SN-20 were added to 600 cc $H_2O$. The mixture was ball milled for 12 hours, then filtered and dried at 120° C. 0.26 g of dried material was made into a 3.5" diameter mat by following the procedure described above. The mat had a thickness of 0.0026", a density of 0.59 g/cc and a specific capacitance of 113 F/g. (see Table I, Book log: 216-5-1).

Example 5
Fibril-Activated Carbon Composite Electrodes 0.2 g activated carbon C-30 (Spectracorp) was ground with a marble agitate mortar for 15 minutes, then dispersed in 50 cc $H_2O$. 0.1 g oxidized CC fibrils were dispersed in 50 cc of water. 5 drops of Triton-100 was added to the C-30 dispersion. After mixing the two dispersions together, the mixture was sonicated with a 500 W ultrasound dispenser for 5 minutes and then filtered, washed, and dried to yield a 3.5" mat. Finally the mat was heated at 350° C. in air for 4 hours. The specific capacitance of the mat was 144 F/g. (see Table I, Book No. 216-26-1).

For the Examples relating to Fibril-Activated Carbon Composite Electrodes, see Table 1, Book No. 211-4-1, 211-6-1, 211-10-1, 211-14-1, 211-18-1, 211-19-1, 211-21-1, 211-24-1, 211-31-1, 216-26-1, 216-30-1 and 216-50-1.

Example 6
Fibril-NiO Electrodes

Three mats with diameters of 0.5" made from oxidized Hyperion fibrils were soaked in 2 M $Ni(NO_3)_2$ for 12 hours. After drying at 180° C., the mats were heated at 300° C. in air for 1 hour to convert impregnated $Ni(NO_3)_2$ to NiO. The weight gain was 13.5%, which suggested 13.5% NiO loading on the mats. Two mats were made into a test electrochemical capacitor using 4 M KOH as the electrolyte. A specific capacitance of 54.5 F/g was measured for the fibril-NiO electrode. The results are shown in Table I, Book No. 216-27-1.

Example 7
Fibril-$MoC_x$ Electrodes

An oxidized fibril mat was placed in a hot zone at temperatures between 1000–1400° C. and 1 g $MoO_3$ was placed in a cold zone at a temperature of 800° C., in a two zone furnace. The furnace was purged with 60 cc/m in flowing Ar to carry $MoO_3$ vapor onto the surface of the fibril mat. A layer of MoCx was formed on the fibril mat surface. The thickness of the layer can be controlled by the duration of the reaction.

Example 8

Fibril-MoC$_x$ Electrodes

An oxidized fibril mat was impregnated with 2 M $(NH_4)_6Mo_7O_{24} \cdot 6H_2O$. After drying at 120° C., the mat was heated at 400° C. in air for 6 hours to decompose impregnated $(NH_4)_6Mo_7O_{24} \cdot 6H_2O$ into $MoO_3$. Finally the mat was heated in flowing $CH_4/H_2$ (3/1) at 300° C. for 2 hours, at 400° C for 2 hours and at 500° C. for 12 hours to convert $MoO_3$ to $MC_x$.

Example 9

Fibril-Mo$_2$N Electrode

A fibril-Mo$_2$N electrode was prepared by temperature-programmed reduction of a fibril mat loaded with $MoO_3$ (described in Example 8) with flowing $NH_3$. The reduction temperature was increased at a rate of 1° C./min from room temperature to 700° C., and maintained at 700° C. for 4 hours.

| | CAPACITORS BASED ON COMPOSITE ELECTRODES | | | | | | |
|---|---|---|---|---|---|---|---|
| Book# | Type | Thickness | Density (g/cm$^3$) | E.S.R ($\Omega$) | Cv (F/g)[1] | C$_p$ (F/g)[2] | Comments |
| 211-4-1 | O-CC/Activated carbon (1/1), 350° C. | 0.0043" | 0.47 | 0.079 | 15.1 | 121 | AC was used as received |
| 211-6-1 | O-CC/Activated carbon (1/1), 350° C. | 0.003" | 0.79 | 0.107 | 18.5 | 148 | AC was washed with acid |
| 211-8-1 | O-CC/Activated carbon (1/2), 350° C. | 0.0049" | 0.73 | 0.09 | 24.4 | 195 | AC was washed with acid |
| 211-10-1 | O-CC/Activated carbon (1/2), 450° C. | 0.003" | 0.45 | 0.095 | 9.1 | 72.7 | |
| 211-14-1 | O-CC/Activated carbon (1/3), 350° C. | 0.0046" | 0.53 | 0.085 | 15.8 | 126 | |
| 211-18-1 | O-CC/Fishbone Fibrils (1/3), 350° C. | 0.0048" | 0.66 | 0.069 | 5.45 | 43.4 | |
| 211-19-1 | O-CC/Activated carbon (1/3), 350° C. | 0.004" | 0.64 | 0.109 | 18.29 | 146 | |
| 211-21-1 | O-CC/Fishbone Fibrils (1/1), 350° C. | 0.0046" | 0.80 | 0.102 | 7.39 | 59.12 | |
| 211-24-1 | O-CC/Activated carbon (1/2), 350° C. | 0.0047" | | 0.069 | 24.18 28.96 | 193.4 (10 mA) 231.7 (5 mA constant current charge) | |
| 211-31-1 | O-CC/Activated carbon (1/2), 700° C. in Ar | 0.006" | 0.54 | 0.156 | 22.1 35.46 | 176.8 (10 mA) 283.7 (5 mA) | |
| 211-72-1 | Mat made from a mixture of as made CC and AC (1/2), mixed by ball mill | 0.0019" | 0.58 | 0.093 | 17.4 | 139.4 | |
| 216-5-1 | Mat made from a mixture of O-CC and AC (1/2), mixed by ball mill | 0.0026" | 0.59 | 0.076 | 14.1 | 113.1 | |
| 216-26-1 | O-CC/activated carbon C-30 (1/2) | 0.032 | 0.62 | 0.075 | 18 | 144 (10 mA) 157 (2 mA) | |
| 216-27-1 | Oxidized fibril mat with 13.7% NiO on surface | | | 0.114 | 6.8 | 54.5 | |
| 205-66-1 | O-CC modified with 20% RuO$_2$ | 0.0016" | | 0.293 | 31 | 249[3] | |
| 216-30-1 | O-CC/activated carbon M-30 (1/2) | 0.005" | 0.39 | 0.071 | 20.1 | 164 | AC from Spectracorp |
| 211-50-1 | Mat from a mixture of fishbone fiber and oxidized fibrils (2/1) | 0.0022 | 0.53 | 0.113 | | 44.8 | Fishbone fiber was activated with CO$_2$ at 800° for 1 hr. |

I claim:

1. A composition for use in an electrode for electrochemical capacitors, comprising:
   a) an electrochemically active material; and
   b) carbon nanofibers having a surface area greater than about 100 m$^2$/gm.

2. A composition for use in an electrode for electrochemical capacitors comprising:
   a) an electrochemically active material; and
   b) carbon nanofibers having a surface area greater than about 100 m$^2$/gm which exhibit electrical capacitance and serve to consolidate the electrode.

3. The composition as claimed in claim 1, wherein the carbon nanofibers are substantially cylindrical and of substantially constant diameter, have graphitic layers concentric with the nanofiber axis and are substantially free of pyrolytically deposited carbon.

4. The composition as claimed in claim 1, wherein the electrochemically active material is selected from the group consisting of: activated carbon, carbon aerogels, carbon foams derived from polymers, oxides, hydrous oxides, carbides, nitrides and conducting polymers.

5. The composition as claimed in claim 4, wherein the oxides and hydrous oxides are selected from the group consisting of $RuO_2$, $IrO_2$, NiO, $MnO_2$, $VO_x$, $PbO_2$ and $Ag_2O$.

6. The composition as claimed in claim 4, wherein the carbides and nitrides are selected from the group consisting of $MoC_x$, $Mo_2N$, $WC_x$ and $WN_x$.

7. The composition as claimed in claim 4, wherein the conducting polymers are selected from the group consisting of polyaniline, polypyrrole, polythiophene, and their derivatives.

8. The composition as claimed in claim 1, wherein the nanofibers are substantially free of micropores.

9. The composition as claimed in claim 1, wherein the nanofibers are functionalized.

10. The composition as claimed in claim 9, wherein the nanofibers are functionalized with one or more functional groups selected from the group consisting of quinone, hydroquinone, quaternized aromatic amines, mercaptans and disulfides.

11. The composition as claimed in claim 1, wherein the nanofibers are coated with a thin coating of a layer of a pyrolyzed carbonaceous polymer.

12. The composition as claimed in claim 11, wherein the coating layer comprises one or more polymers selected from the group consisting of phenolics-formaldehyde, polyacrylonitrile, styrene DVB, cellulosic polymers, and H-resin.

13. The composition as claimed in claim 1, wherein said nanofibers are intertwined and interconnected to form a rigid porous carbon structure.

14. The composition as claimed in claim 1, wherein said nanofibers have a diameter less than about 1000 angstroms.

15. The composition as claimed in claim 1, wherein said nanofibers have a diameter of between about 35 to 75 angstroms, are substantially cylindrical with a substantially constant diameter, have c-axes substantially perpendicular to their cylindrical axis, and are substantially free of pyrolytically deposited carbon.

16. The composition as claimed in claim 1, wherein the carbon nanofibers have a wall comprising a single layer of carbon atoms.

17. A composition for use in an electrode for electrochemical capacitors comprising:
   a) an electrochemically active material selected from the group consisting of activated carbon, carbon aerogels, carbon foams derived from polymers, oxides, hydrous oxides, carbides, nitrides, and conducting polymers; and
   b) carbon nanofibers having a surface area greater than about 100 m$^2$/gm, which exhibit electrical capacitance and which serve to consolidate the electrode, said nanofibers being substantially cylindrical and of a substantially constant diameter, having graphitic layers concentric with the nanofiber axis and being substantially free of pyrolytically deposited carbon.

18. A composite electrode for electrochemical capacitors, comprising:
   a) an electrochemically active material; and
   b) nanofibers having a surface area greater than about 100 m$^2$/gm.

19. A composite electrode for electrochemical capacitors, comprising:
   a) an electrochemically active material; and
   b) nanofibers having a surface area greater than about 100 m$^2$/gm which exhibit electrical capacitance and which serve to consolidate the electrode.

20. The composite electrode as claimed in claim 18, wherein the carbon nanofibers are functionalized.

21. The composite electrode as claimed in claim 18, wherein the nanofibers are intertwined and interconnected to form a rigid porous carbon structure.

22. The composite electrode as claimed in claim 18, wherein the nanofibers are coated with a thin coating of a layer of a pyrolyzed carbonaceous polymer.

23. The composite electrode as claimed in claim 18, wherein said nanofibers have a diameter less than about 1000 angstroms.

24. The composite electrode as claimed in claim 18, wherein said nanofibers have a diameter of between about 35 to 75 angstroms, are substantially cylindrical with a substantially constant diameter, have c-axes substantially perpendicular to their cylindrical axis, and are substantially free of pyrolytically deposited carbon.

25. The composite electrode as claimed in claim 18, wherein the nanofibers have a wall comprising a single layer of carbon atoms.

26. An electrochemical capacitor comprising a composite electrode, said composite electrode comprising an electrochemically active material and nanofibers having a surface area greater than about 100 m$^2$/gm which exhibit electrical capacitance and which serve to consolidate the electrode.

27. An electrochemical capacitor, comprising:
   a) first and second composite electrodes, each comprising an electrochemically active material and carbon nanofibers having a surface area greater than about 100 m$^2$/gm which exhibit electrical capacitance and which serve to consolidate the electrode; and
   b) an electrode separator disposed between said first and second electrodes, the electrode separator comprising an electrically nonconductive and ionically conductive material.

28. The electrochemical capacitor of claim 27, wherein the nanofibers of the first and second composite electrodes are functionalized.

29. The electrochemical capacitor of claim 27, wherein the nanofibers are functionalized with one or more functional groups selected from the group consisting of quinones, hydroquinones, quaternized aromatic amines, mercaptans and disulfides.

30. The electrochemical capacitor of claim 27, wherein the nanofibers of the first electrode are functionalized with the same functional groups as the nanofibers of the second electrode.

31. The electrochemical capacitor of claim 27, wherein the nanofibers of the first electrode are functionalized with different functional groups as the nanofibers of the second electrode.

32. The electrochemical capacitor of claim 27, wherein the nanofibers of said first and second composite electrodes are substantially cylindrical carbon nanofibers of substantially constant diameter, having graphitic layers concentric with the nanofiber axis and being substantially free of pyrolytically deposited carbon.

* * * * *